US012436751B1

(12) United States Patent
Mitra et al.

(10) Patent No.: US 12,436,751 B1
(45) Date of Patent: Oct. 7, 2025

(54) DISTRIBUTION NETWORK USING ROADSIDE RESOURCES AND DIRECT VEHICLE-TO-VEHICLE COMMUNICATION

(71) Applicant: Amazon Technologies, Inc., Seattle, WA (US)

(72) Inventors: Indraneel Mitra, Edgewater, NJ (US); Brett Francis, Redwood City, CA (US); David Joseph Mifsud, Lake Stevens, WA (US)

(73) Assignee: Amazon Technologies, Inc., Seattle, WA (US)

( * ) Notice: Subject to any disclaimer, the term of this patent is extended or adjusted under 35 U.S.C. 154(b) by 84 days.

(21) Appl. No.: 17/810,311

(22) Filed: Jun. 30, 2022

(51) Int. Cl.
*G06F 8/65* (2018.01)
*H04L 67/12* (2022.01)

(52) U.S. Cl.
CPC .............. *G06F 8/65* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 9,439,121 B2 | 9/2016 | Barreto De Miranda Sargento et al. | |
| 9,756,684 B2 | 9/2017 | Tammisetti | |
| 11,710,355 B1* | 7/2023 | Wenneman | H04L 67/12 701/29.3 |
| 2005/0156715 A1* | 7/2005 | Zou | B60R 25/33 340/8.1 |
| 2009/0259734 A1* | 10/2009 | Morikawa | G06F 8/61 709/220 |
| 2010/0058468 A1* | 3/2010 | Green | G06F 21/51 726/22 |
| 2014/0310702 A1* | 10/2014 | Ricci | G06Q 20/321 717/173 |
| 2015/0220321 A1* | 8/2015 | Jung | H04L 67/12 717/169 |
| 2015/0271247 A1* | 9/2015 | Patsiokas | H04L 69/14 709/217 |
| 2017/0322791 A1* | 11/2017 | Tiles | G06F 8/65 |
| 2017/0364349 A1* | 12/2017 | Conant | G06F 8/60 |
| 2018/0014146 A1* | 1/2018 | Gulati | H04W 76/10 |
| 2018/0014317 A1* | 1/2018 | Gulati | H04L 5/0005 |
| 2018/0336024 A1* | 11/2018 | Klische | G06F 8/65 |
| 2019/0050217 A1* | 2/2019 | Tatourian | G06F 8/65 |

(Continued)

OTHER PUBLICATIONS

U.S. Appl. No. 17/548,401, filed Dec. 10, 2021, Brett Francis, et al.

(Continued)

*Primary Examiner* — Qing Chen
(74) *Attorney, Agent, or Firm* — Alexander A. Knapp; Kowert, Hood, Munyon, Rankin & Goetzel, P.C.

(57) ABSTRACT

A vehicle artifact (e.g., software, firmware, content, etc.) distribution system uses direct vehicle-to-vehicle communications to extend a range of physical infrastructure and to improve speed and cost of distributing artifacts to vehicles. An artifact to be distributed is assigned a vehicle-to-vehicle distribution policy that defines gateway vehicle selection, wherein gateway vehicles are used to distribute the artifact to other recipient vehicles. A local software agent executing on the vehicles distributes the artifact in accordance with the vehicle-to-vehicle distribution policy using locally installed antennas of the vehicles.

20 Claims, 10 Drawing Sheets

(56) References Cited

U.S. PATENT DOCUMENTS

| | | |
|---|---|---|
| 2019/0108010 A1* | 4/2019 | Tillman .................. H04L 67/12 |
| 2019/0217777 A1* | 7/2019 | John Naum Vangelov ................. G06F 11/07 |
| 2019/0380014 A1* | 12/2019 | Onishi ............. G08G 1/096791 |
| 2020/0201621 A1* | 6/2020 | Buecherl ................... G06F 8/65 |
| 2020/0286020 A1* | 9/2020 | Kobayashi ......... G01C 21/3438 |
| 2020/0401391 A1* | 12/2020 | Ucar ................... G01C 21/3438 |
| 2021/0224056 A1* | 7/2021 | John ...................... H04W 4/46 |
| 2022/0147337 A1* | 5/2022 | Michelsohn ........ G06F 11/1433 |

OTHER PUBLICATIONS

U.S. Appl. No. 17/810,326, filed Jun. 30, 2022, Indraneel Mitra, et al.

* cited by examiner

DISTRIBUTION NETWORK USING ROADSIDE RESOURCES AND DIRECT VEHICLE-TO-VEHICLE COMMUNICATION

BACKGROUND

Modern vehicles, such as cars, trucks, motorcycles, etc. may include many different software applications that perform various functions for the vehicle. For example, a safety-related application may perform diagnostics on brake performance. As another example, a navigation application may display a current location of the vehicle on a map. Modern cars often have antennas that provide connectivity with remote entities. For example, a vehicle may be equipped with a cellular antenna (e.g., 4G, 5G, etc.), and/or a Wi-Fi antenna.

Sometimes an application may need to be updated on a vehicle, or content to be used by an application may need to be distributed to the vehicle. Such software updates and/or content may be provided to the vehicle from a central location, such as a data center comprising one or more servers operated by (or on behalf of) a vehicle original equipment manufacturer (OEM), third-party parts supplier, or other entity. In such a scenario, existing network and/or cellular network infrastructure may be used to communicate the software update or content to each vehicle that is to receive the software update and/or the content from the central location.

Figure 1:
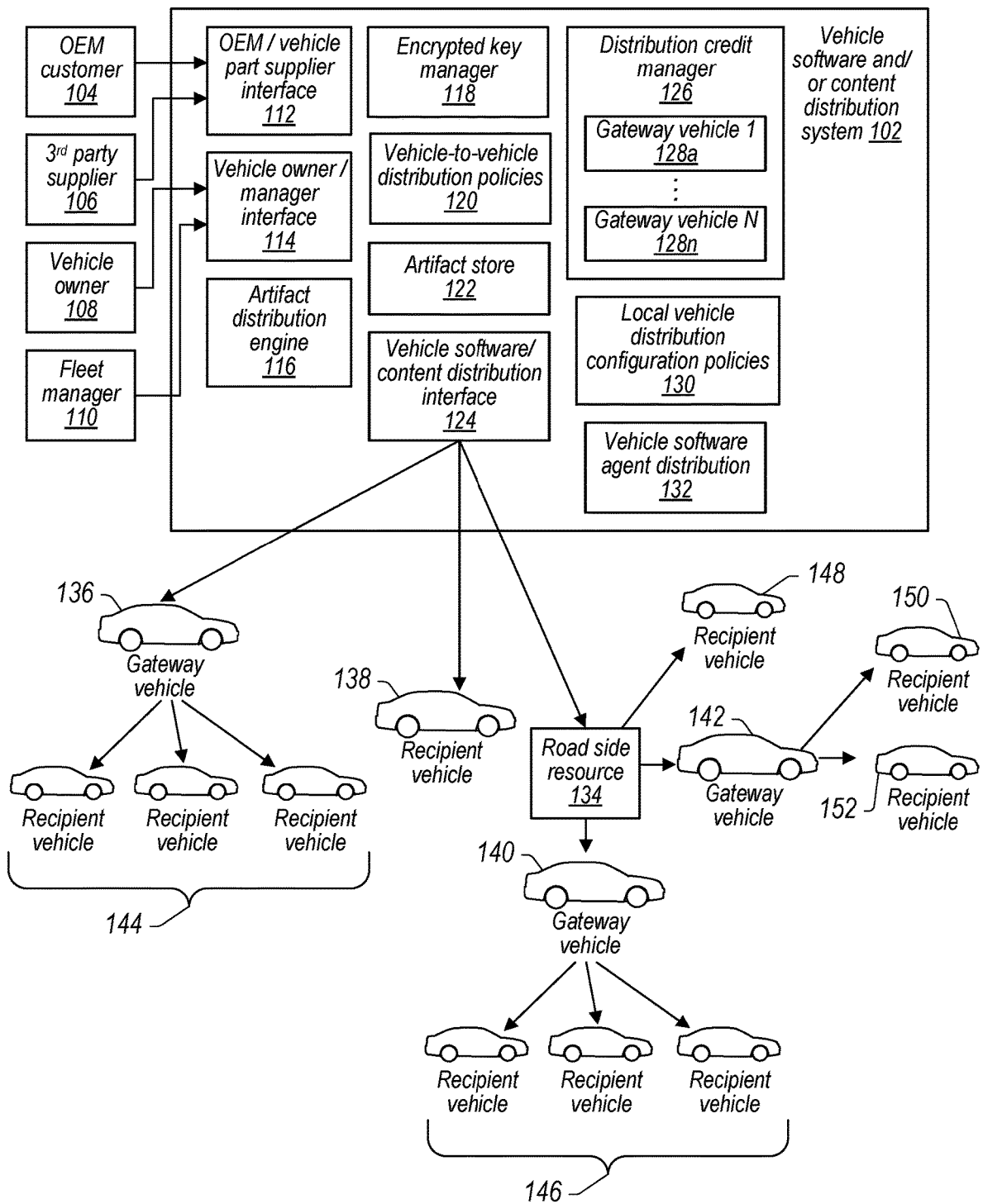
FIG. 1 is a logical block diagram illustrating a vehicle software and/or content distribution system using direct vehicle-to-vehicle distribution of artifacts, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to implement direct vehicle-to-vehicle artifact (e.g., software, firmware, content, etc.) distribution for vehicles, according to some embodiments. In embodiments, implementing direct vehicle-to-vehicle artifact distribution may improve speed of distribution of artifacts (e.g., software updates, firmware updates, content, etc.) to vehicles. Also, direct vehicle-to-vehicle artifact distribution may reduce network infrastructure costs associated with distribution of artifacts (e.g., software updates, firmware updates, content, etc.) to vehicles, amongst other benefits.

Current software update and/or content distribution mechanisms to vehicles often distribute the software updates and/or content from a centralized source. For example, a data center in a region may be a source for software updates and/or content that is to be distributed to vehicles in the region. Such an architecture requires each vehicle to be able to connect to the centralized source and also requires sufficient network infrastructure to support such connections. However, for various reasons, some vehicles in the region may not be able to connect to the centralized source, for example due to a lack of a wireless connection, or if able to connect, the vehicles may be provided a low-quality connection that limits an ability to quickly transmit data to the vehicles. For such vehicles, distribution of the software updates and/or content may be delayed. Also, costs associated with distributing the content to the vehicles may be high as network infrastructure investments are required to support the connections between the vehicles and the centralized source.

In some embodiments, to improve speed of delivery and/or cost of distribution, amongst various other advantages, a direct vehicle-to-vehicle distribution may be used. In such a system, only a portion of a set of vehicles that are to receive a software update, firmware update, and/or content are required to connect to a source of the software update, firmware update and/or content. For example, in some embodiments as few as a single vehicle may connect to a source of the software update, firmware update, and/or content, for example via a roadside resource. The portion of the vehicles (which may be as a few as a single vehicle) that have received the software update, firmware update, and/or content may then function as gateway vehicles to other vehicles within a wireless communication range of respective antennas of the gateway vehicle and the other vehicles that will be recipients of the software update, firmware update, and/or content from respective ones of the gateway vehicles. Thus, vehicles who may not have access to a connection to a centralized source of the software update, firmware update, and/or content may, nevertheless, receive the software update, firmware update, and/or content in a timely manner as long as the vehicles are within range of at least one gateway vehicle that has received the software update, firmware update, and/or content. In some embodiments, a vehicle may function as both a recipient vehicle in relation to another vehicle that is providing the software update, firmware update, and/or content to the recipient vehicle and also function as a gateway vehicle to other vehicles that are to receive the software update, firmware update, and/or content from the vehicle. Thus, a distribution range for direct vehicle-to-vehicle distribution may be extended by having overlapping distribution ranges of gateway vehicles.

For example, in some embodiments, a gateway vehicle may serve as an artifact delivery gateway for a set of vehicles within a geofence, wherein the geofence represents a geographical area within range of an antenna of the gateway vehicle. Of the vehicles in the geofence, one or more of the vehicles, may function as additional gateway vehicles, each having respective geofences based on geographical areas that are within respective ranges of the antennas of the additional gateway vehicles. In this way, the gateway vehicles may form a distribution network mesh. However, whereas centralized distribution systems would require infrastructure investments to build out a distribution network, a gateway vehicle network mesh formed using direct vehicle-to-vehicle distribution may be formed using existing hardware that is already installed on the vehicles without a need for equivalent network investment, like would be the case for a centralized distribution system. Also, a gateway vehicle network mesh formed using direct vehicle-to-vehicle distribution is dynamic in the sense that the coverage area of the network is not tied to a specific geographic location, but is instead determined based on current locations of the vehicles, e.g., gateway vehicles and recipient vehicles.

In some embodiments, roadside resources may be used to distribute artifacts (e.g., software updates, firmware updates, and/or content) to gateway vehicles. In some embodiments, the roadside resources may be connected to a cloud-based vehicle software and/or content distribution system. The cloud-based system may distribute the artifacts to the road side resources, and the roadside resources may in turn distribute the artifacts to gateway vehicles, who then distribute the artifacts to other vehicles (e.g., recipient vehicles or gateway vehicles for adjoining geofences).

In some embodiments, a road side resource may include mobile edge computing (MEC) infrastructure and/or road side units (RSUs). The road side resources may be configured to establish wireless connections with vehicles within a geofence range of the respective road side resource. In some embodiments, roadside resources may use various wireless communication protocols or technologies, such as 5G, 4G, Wi-Fi, dedicated short-range communication (DSRC), PC5, etc.

In some embodiments, a first vehicle (which may be parked or in motion) is notified of an availability of an artifact (e.g., software update, firmware update, content, etc.) by a roadside resource or directly from a cloud-based vehicle software and/or content distribution system. For example, the notification may be received at the first vehicle via a short-range communication from a roadside resource or a gateway vehicle, or may be received at the first vehicle via a cellular network connection or Wi-Fi connection to the cloud-based system. The first vehicle applies a locally stored vehicle-to-vehicle distribution configuration policy to determine how to respond to the notification of availability. For example, a gateway vehicle may store a first vehicle-to-vehicle distribution configuration policy that instructs the gateway vehicle to receive artifacts that the gateway vehicle does not need to locally apply, but may distribute to other recipient vehicles. Also, a recipient vehicle may store a second vehicle-to-vehicle distribution configuration policy that instructs the recipient vehicle not to use resources to receive artifacts that the recipient vehicle does not need locally.

In addition to the locally stored vehicle-to-vehicle distribution configuration policy, the artifact may be paired with metadata indicating a vehicle-to-vehicle distribution policy to be used to distribute the artifact. For example, some artifacts may be paired with a vehicle-to-vehicle distribution policy that prioritizes speed of distribution, while other artifacts may be paired with vehicle-to-vehicle distribution policies that prioritize low cost of distribution. Other artifacts may be paired with hybrid vehicle-to vehicle distribution policies that give different weights to speed and cost, or that might emphasize tradeoffs between speed, cost and other factors. In some embodiments, the use of in-vehicle resources may be used as a weighting factor, such as optimization for "lowest use of compute during the day". In some embodiments, other weighting factors may be used, such as how widely an artifact is to be distributed. In some embodiments, a width of distribution weighting factor may be used in combination with cost and speed weighting factors (or other weighting factors), to achieve a distribution that optimizes speed and/or cost while ensuring a certain width of distribution. Additional weighting factors may include diversity of distribution, e.g., that the artifact is distributed to a diverse group of vehicles, such as vehicles included in various different fleets, as opposed to concentrated distribution in a few fleets. In some embodiments, a vehicle-to-vehicle distribution policy may prioritize "seeding" groups of vehicles with the artifact to increase a rate at which the artifact is propagated. For example, a vehicle-to-vehicle distribution policy may prioritize providing the artifact to at least one vehicle of each of a plurality of fleets or to at least one vehicle of each of a plurality of groups located in a geofence that overlaps a geofence of the vehicle doing the distribution of the artifact.

In some embodiments, the notification of the availability of an artifact may further indicate the vehicle-to-vehicle distribution policy to be applied to distribute the artifact. In some embodiments, a local agent executing in a vehicle may consult both the locally stored vehicle-to-vehicle distribution configuration policy for the vehicle (e.g., is the vehicle a gateway vehicle or a recipient vehicle) and the vehicle-to-vehicle distribution policy for the artifact (e.g., speed optimized, cost optimized, etc.). Based on these policies and vehicle conditions, the agent executing at the vehicle may make a determination whether or not to initiate a connection with the entity providing the notification of availability (e.g., roadside resource, gateway vehicle, etc.). For example, various vehicle conditions that may be used in making a determinization, amongst others, include: vehicle travel state (parked or in motion), vehicle battery life, signal strength with the advertising entity and bandwidth of the signal, available computing resources of the vehicle, direction of travel (e.g., towards or away from the advertising entity), etc. Based on the respective policies and the vehicle conditions the agent executing at the vehicle may determine to 1) receive the artifact and apply it locally at the vehicle without further distribution, 2) receive the artifact, apply it locally at the vehicle, and advertise the availability of the artifact to other vehicles, 3) receive the artifact, cache the artifact locally without applying it at the vehicle, and advertise the availability of the artifact to other vehicles, or 4) decline to receive the artifact.

In some embodiments, in addition to the metadata included in an artifact availability advertisement indicating the vehicle-to-vehicle distribution policy to be used for distributing the artifact, the metadata included in the advertisement may further include a cryptographic signature for the artifact. In some embodiments, the local agent may validate the cryptographic signature to ensure the artifact is from a trusted source. In some embodiments, a vehicle software and/or content distribution system may provide the vehicles with key material and may further provide cryptographic signatures with artifacts that complement the key material provided to the vehicles. In this way, a local agent executing on a vehicle may validate cryptographic keys or tokens that accompany artifacts (e.g., cryptographic signatures) in order to validate that the artifact is being provided by the vehicle software and/or content distribution system (or a customer of the vehicle software and/or content distribution system, for which the system has provided a cryptographic signature).

If the first vehicle is to advertise the availability of the artifact to other vehicles based on its locally stored vehicle-to-vehicle distribution configuration policy, the first vehicle performs a network discovery to discover other potential recipient vehicles that are within a range of the first vehicle's antennae. The first vehicle then notifies the vehicles within the range of the first vehicle's antennae (e.g., the first vehicle's geofence) of the availability of the artifact, the vehicle-to-vehicle distribution policy associated with the artifact, and/or a cryptographic signature to be used to validate the source of the artifact. This advertisement may be performed using direct peer-to-peer communication between the first vehicle and the other vehicles in the geofence of the first vehicle. For the other vehicles that accept to receive the artifact based on the advertisement, the first vehicle streams the artifact and its metadata to the other accepting vehicles using a high-speed, low-latency short range communication protocol, such as PC5, for example.

In some embodiments, each of the other vehicles that receive the artifact and its associated metadata from the first vehicle may perform a similar process as that performed by the first vehicle to further distribute the artifact to even more vehicles.

If streaming of an artifact is interrupted, or otherwise does not complete, local states may be maintained in the recipient vehicles and streaming may resume after the interruption.

FIG. 1 is a logical block diagram illustrating a vehicle software and/or content distribution system using direct vehicle-to-vehicle distribution of artifacts, according to some embodiments.

In some embodiments, a vehicle software and/or content distribution system, such as vehicle software and/or content distribution system 102, may receive vehicle software, vehicle firmware, media content, or any other information/instructions that are to be distributed to a class of vehicles from various customers of the vehicle software and/or content distribution system, such as an original equipment manufacturer (OEM) customer 104, a third-party supplier customer 106, a vehicle owner 108, and/or a fleet manager 110. In some embodiments, the vehicle software and/or content distribution system 102 may be included in a larger service provider network, that provides other cloud-based services to customers and/or clients of the service provider network. In some embodiments, the service provider network may include a plurality of data centers, wherein cloud-based computing devices are housed in the data centers and provide cloud-based resources, for example that may be used to implement the vehicle software and/or content distribution system 102.

In some embodiments, a vehicle software and/or content distribution system may include an original equipment manufacturer (OEM) and/or vehicle part supplier interface 112. The interface 112 is configured to accept artifacts (e.g., software updates, firmware updates, content, etc.) that are to be distributed to vehicles manufactured by the OEM or to vehicles that include components provided by the vehicle part supplier. For example, an OEM or part supplier may provide an artifact comprising a software or firmware update that is be distributed to a particular class of vehicles, such as vehicles manufactured by the OEM, or that include a particular feature, or that include a particular third-party part, as a few examples. Also, a vehicle-to-vehicle distribution policy may be submitted via the interface 112, wherein the vehicle-to-vehicle distribution policy may be used to inform how the artifact is to be distributed.

For example, a safety sensitive artifact (e.g., a software update that improves a safety system) may be submitted with a speed optimized vehicle-to-vehicle distribution policy, whereas as an entertainment-based artifact (e.g., software to implement a new feature in the vehicle's stereo system, as an example) may be submitted with a cost optimized vehicle-to-vehicle distribution policy. Note that speed optimized and cost optimized vehicle-to-vehicle distribution policies are given as examples, various other hybrid vehicle-to-vehicle distribution polices may also be used, or vehicle-to-vehicle distribution policies may take into account other parameters. The vehicle software and/or content distribution system may provide the artifact and associated vehicle-to-vehicle distribution policy (or metadata indicating the selected vehicle-to-vehicle distribution policy) to a first distribution entity, such as a roadside resource. The first distribution entity may provide the artifact and associated vehicle-to-vehicle distribution policy to recipient entities that may further distribute the artifact with its associated vehicle-to-vehicle distribution policy. The first and subsequent distribution entities may intelligently determine how to distribute the artifact to a next distribution entity based on the vehicle-to-vehicle distribution policy. In some embodiments, a next distribution entity that is to receive the artifact may determine how best to receive the artifact based on the vehicle-to-vehicle distribution policy associated with the artifact.

As an example, a vehicle driving by a roadside resource may be informed of the availability of an artifact and its associated vehicle-to-vehicle distribution policy. An agent of the vehicle may determine a cost and/or speed with which the artifact can be received at the vehicle based on a number of parameters. For example, if the vehicle is driving away from the roadside resource, the agent may determine that speed of reception of the artifact would be faster (e.g., shorter amount of time to receive the artifact) if the artifact was to be downloaded using a cellular network connection since the vehicle is driving away from the roadside resource and no other gateway vehicles are currently advertising the artifact. Also, the agent may determine that cost of receiving the artifact may be reduced by delaying receiving the artifact until the vehicle encounters another gateway vehicle advertising the artifact (or another roadside resource advertising the artifact). Thus, the agent may determine to either retrieve the artifact using a cellular network connection or to delay receiving the artifact until it is advertised via a direct vehicle-to-vehicle communication from another vehicle or roadside resource. This determination may be based on the vehicle-to-vehicle distribution policy associated with the artifact. Also, the agent may further take into account a locally stored vehicle-to-vehicle distribution configuration policy for the vehicle. For example, for gateway vehicles, the locally stored vehicle-to-vehicle distribution configuration policy may instruct the agent to determine if there are any recipient vehicles in a geofence with the gateway vehicle including the agent when determining whether or not to receive a given artifact. Also, for non-gateway vehicles, a different vehicle-to-vehicle distribution configuration policy may instruct the agent to only receive the artifact if needed locally at the vehicle, e.g., to update software or firmware of the vehicle, or to provide content to be consumed at the vehicle.

In some embodiments, the received (or selected) vehicle-to-vehicle distribution policies may be stored in vehicle-to-vehicle distribution policy store 120. Also, the received artifacts may be stored in artifact store 122. Artifact distribution engine 116 may coordinate distribution of the artifacts and associated vehicle-to-vehicle distribution polices via vehicle software/content distribution interface 124, to first level recipients, such as gateway vehicle 136, recipient vehicle 138, and roadside resource 134. Such first level recipients may also function as gateway resources that further distribute the artifact and associated vehicle-to-vehicle distribution policy to next level recipients. For example, gateway vehicle 136 may distribute the artifact and associated vehicle-to-vehicle distribution policy to recipient vehicles 144. Also, roadside resource 134 may distribute the artifact and associated vehicle-to-vehicle distribution policy to gateway vehicle 140 which may further distribute the artifact and associated vehicle-to-vehicle distribution policy to recipient vehicles 146. In a similar manner, roadside resource 134 may distribute the artifact and associated vehicle-to-vehicle distribution policy to gateway vehicle 142 that in turn distributes the artifact and associated vehicle-to-vehicle distribution policy to recipient vehicles 150 and 152. Also, roadside resource 134 may directly distribute the artifact and associated vehicle-to-vehicle distribution policy to recipient vehicle 150.

In some embodiments, vehicles that serve as gateway vehicles may be compensated or otherwise credited for serving as gateway resources. Various compensation and/or credit systems may be used. In some embodiments, distribution credit manager 126 may maintain credit balances for different gateway vehicles, such as credit balances for gateway vehicles 128a through 128n.

In some embodiments, a vehicle owner 108 may designate the vehicle owner's vehicle to participate in artifact distribution as a gateway vehicle via vehicle owner/manager interface 114. Also, a fleet manager may designate one or more vehicles of a fleet to participate in artifact distribution for the fleet via vehicle owner/manager interface 114.

In some embodiments, such designations received via vehicle owner/manager interface 114 may be used to determine (or select) local vehicle distribution configuration policies 130 that may be provided with a vehicle software agent to participating vehicles, or which may be provided as updates to vehicles that already include a vehicle software agent. The distribution interface 132 may facilitate distribution of vehicle software agents and local vehicle distribution configuration polices to the respective vehicles, such as vehicles 136 to 152.

Figure 2:
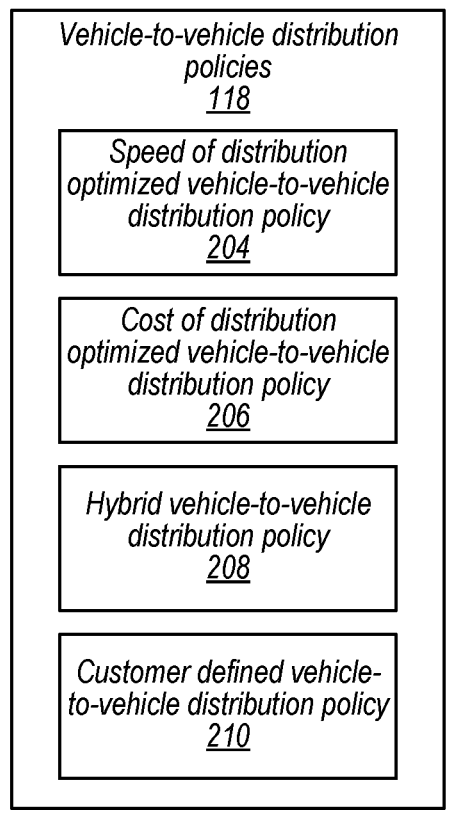
FIG. 2 illustrates example direct vehicle-to-vehicle distribution policies that may be used by a vehicle software and/or content distribution system, according to some embodiments.

FIG. 2 illustrates example direct vehicle-to-vehicle distribution policies that may be used by a vehicle software and/or content distribution system, according to some embodiments.

As an example, vehicle-to-vehicle distribution policies 118 may include a speed of distribution optimized vehicle-to-vehicle distribution policy 204, a cost of distribution optimized vehicle-to-vehicle distribution policy 206, a hybrid vehicle-to-vehicle distribution policy 208, and/or other customer defined vehicle-to-vehicle distribution policies 210.

Figure 3:
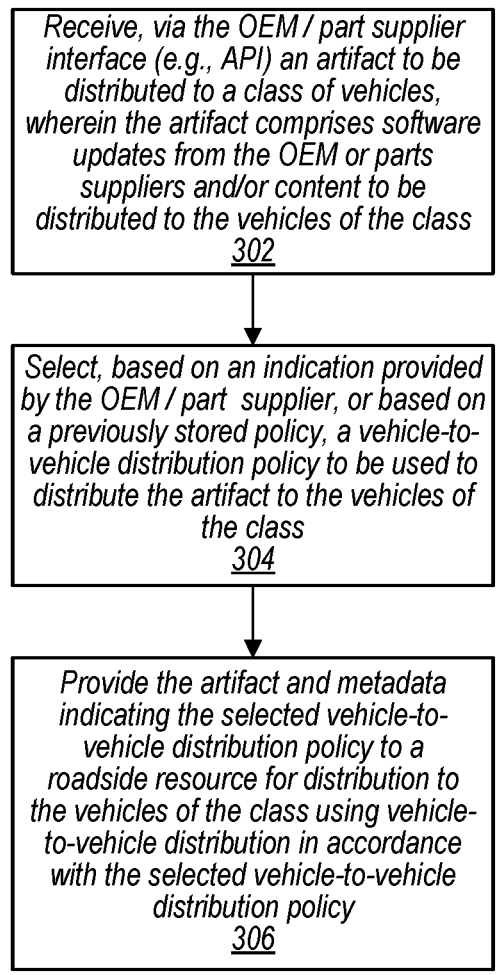
FIG. 3 is a logical flow diagram illustrating a process a vehicle software and/or content distribution system may follow to receive a software update and/or content to be distributed to a class of vehicles along with steps the vehicle software and/or content distribution system takes to initiate distribution of the software update and/or content according to a direct vehicle-to-vehicle distribution policy, according to some embodiments.

FIG. 3 is a logical flow diagram illustrating a process a vehicle software and/or content distribution system may follow to receive a software update and/or content to be distributed to a class of vehicles along with steps the vehicle software and/or content distribution system takes to initiate distribution of the software update and/or content according to a direct vehicle-to-vehicle distribution policy, according to some embodiments.

At block 302, a vehicle software and/or content distribution system receives an artifact to be distributed to a class of vehicles, such as vehicles manufactured by a particular manufacturer, or including parts of a particular $3^{rd}$ party part supplier, as a few examples. The artifact may include code to implement a software update, firmware update, code for a new application, content (e.g., media files, map files, or any other digital information to be communicated to the vehicle), etc. The artifact may be provided to the vehicle software and/or content distribution system via an application programmatic interface of the system, such as OEM/vehicle part supplier interface 112 or vehicle owner/manager interface 114.

At block 304, the vehicle software and/or content distribution system selects a vehicle-to-vehicle distribution policy (e.g., speed optimized, cost optimized, hybrid, etc.) to be used to distribute the artifact to the class of vehicles. In some embodiments, the selection of the vehicle-to-vehicle distribution policy may be based on an indication provided by the customer providing the artifact that is to be distributed. For example, an OEM may indicate that the artifact is safety-related and this indication may be used by the vehicle software and/or content distribution system to select a speed optimized vehicle-to-vehicle distribution policy. For example, in some the vehicle software and/or content distribution system may store a general policy for assigning vehicle-to-vehicle distribution policies to artifacts that instructs speed optimized polices to be used for safety related updates and/or assigns other policies (e.g., cost optimized, hybrid, etc.) to be assigned to other types of artifacts that are not safety related. In some embodiments, the customer may provide a custom vehicle-to-vehicle distribution policy along with the artifact, wherein the customer defines weightings to be used in making distribution decisions locally by local agents in the vehicles using the vehicle-to-vehicle distribution policy associated with a given artifact to be distributed.

At block 306, the vehicle software and/or content distribution system provides the artifact to be distributed along with its associated vehicle-to-vehicle distribution policy (e.g., metadata) to a first level distribution entity, such as a roadside resource or gateway vehicle. The first distribution entity may advertise the artifact to additional distribution entities or recipients, and the additional distribution entities or recipients may determine whether and/or how to receive the artifact (e.g., via direct vehicle-to-vehicle communications, from a roadside resource, for a cloud-based resource, etc.) based on metadata included in the advertisements indicating the vehicle-to-vehicle distribution policy for the artifact. For example, the artifact may be distributed in accordance with the vehicle-to-vehicle distribution policy using direct vehicle-to-vehicle communications for at least some of the distribution as shown in FIG. 1 with regard to vehicles 136-152.

Figure 4A:
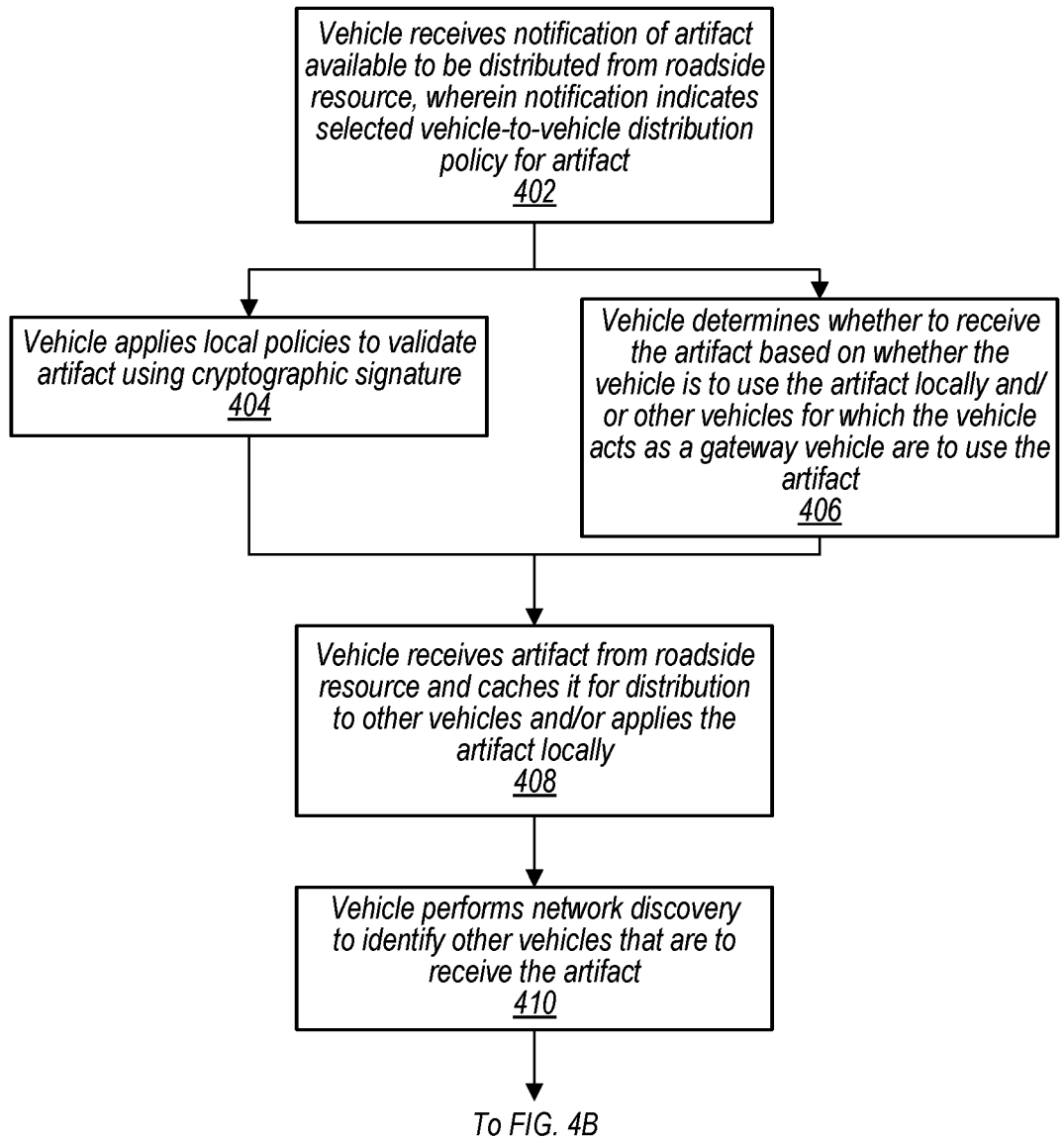
FIGS. 4A-4B are logical flow diagrams illustrating a process vehicles follow to distribute a software update and/or content among the vehicles in accordance with a vehicle-to-vehicle distribution policy, according to some embodiments.
Figure 4B:
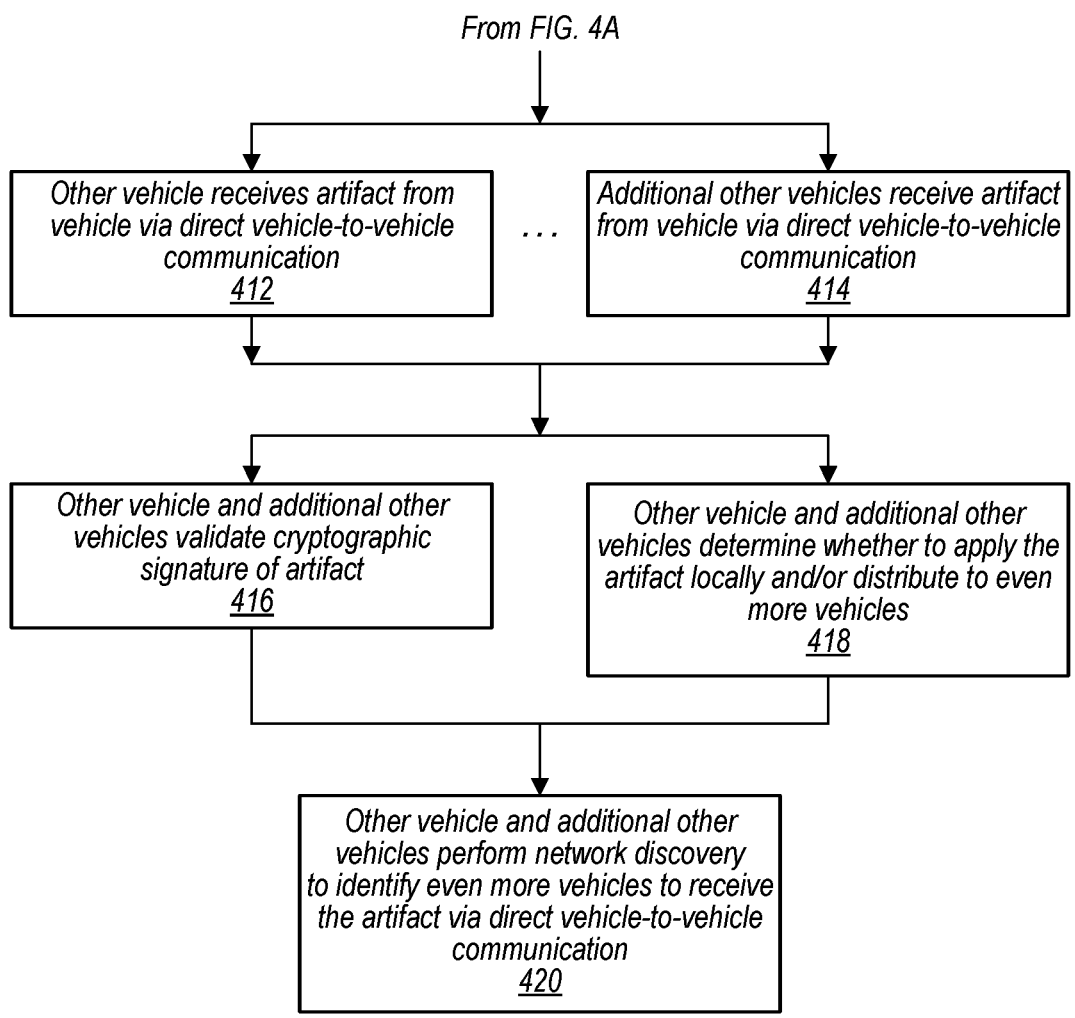

FIGS. 4A-4B are logical flow diagrams illustrating a process vehicles follow to distribute a software update and/or content among the vehicles in accordance with a vehicle-to-vehicle distribution policy, according to some embodiments.

At block 402 a vehicle, such as any of the vehicles shown in FIG. 1, receives a notification of an artifact available to be distributed from a first distribution entity, such as a roadside resource. The notification includes metadata indicating a vehicle-to-vehicle distribution policy to be used to distribute the artifact. The notification may also include a cryptographic signature associated with the artifact provided by the encrypted key manager 118. At block 404, a software agent executing on the vehicle (such as may have been provided by vehicle software agent distribution module 132) applies local policies to validate the authenticity and/or source of the artifact using the cryptographic signature. In some embodiments, a cryptographic signature may be used to authenticate an identity of the entity advertising the availability of the artifact (e.g., to authenticate the roadside resource or gateway vehicle). At block 406, the agent executing on the vehicle determines whether or not the vehicle needs the artifact for local use or if the artifact is needed by other vehicles in a geofence with the vehicle, where the vehicle serves as a gateway vehicle. In some embodiments, the vehicle may also take into account local conditions of the vehicle, e.g., is the vehicle parked or in motion, what is the battery level of the vehicle, are there excess computing resources available at the vehicle, etc., to determine whether or not to receive the artifact being advertised. These determinations may also be based on the locally stored vehicle-to-vehicle distribution configuration policy of the vehicle. For example, a locally stored vehicle-to-vehicle distribution configuration policy may designate the vehicle as a gateway vehicle and may further define a set of recipient vehicles of a fleet for which the gateway vehicle functions as a distribution gateway. In other embodiments, the locally stored vehicle-to-vehicle distribution configuration policy may define a geographical area (e.g., geofence) in which the vehicle is to identify recipient vehicles for which the vehicle is to function as a distribution gateway. In some embodiments, the locally stored vehicle-to-vehicle distribution configuration policy may include instructions for electing a gateway vehicle amongst vehicles in a same geofence. For example, a leader election protocol may be followed. In some embodiments, the locally stored vehicle-to-vehicle distribution configuration policy may indicate that the vehicle is not eligible to be elected as a gateway vehicle. For example, some vehicles may be equipped with minimal resources that exclude the vehicle from participating as a gateway vehicle.

At block 408, in response to determining to receive the artifact at block 406, the vehicle then receives the artifact via a direct communication either between the roadside resource and the vehicle (if the artifact is being advertised by the roadside resource) or via a direct communication between vehicles (if the artifact is being advertised by a gateway vehicle). If the artifact is to be distributed to other vehicles, it may be cached at the recipient vehicle for further distribution. Also, if the artifact is to be applied at the recipient vehicle it may also be applied in parallel with subsequent distribution.

At block 410 the vehicle that received the artifact at block 408, if also serving as a gateway vehicle, performs network discovery to identify other vehicles within a geofence or fleet to which the vehicle belongs. The vehicle also broadcast an advertisement to the discovered vehicles indicating the artifact is available to be distributed to the discovered vehicles.

At block 412, another vehicle (e.g., one of the discovered vehicles) receives the artifact in response to a positive response to the advertisement. The artifact is provided to the other vehicle (from the first vehicle that received the artifact in block 408) via direct vehicle-to-vehicle communication. Also, at block 414 a similar process is performed for additional vehicles (e.g., other ones of the discovered vehicles) that have elected to receive the artifact.

At blocks 416 and 418 the other vehicle and additional vehicle perform similar operations as were performed by the first vehicle to validate and authenticate the artifact and to determine whether to apply the artifact locally and/or cache it for further distribution. The process may continue to an additional layer of vehicles in a subsequent distribution round at block 420.

Figure 5:
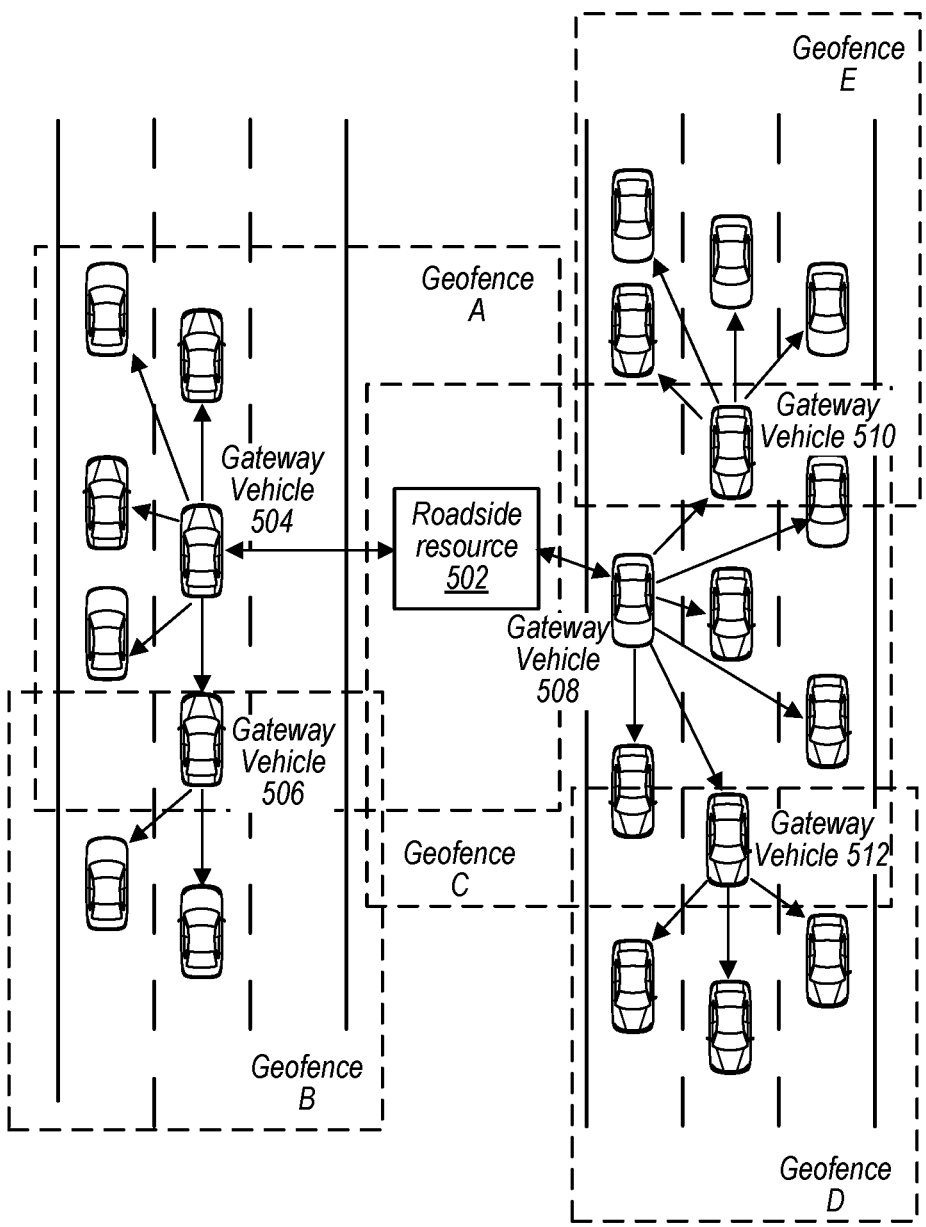
FIG. 5 illustrates a top view of a roadway wherein vehicles in the roadway are included in overlapping geofences, and wherein gateway vehicles receive an artifact to be distributed from a roadside resource and distribute the artifact to recipient vehicles in their respective geofences, wherein at least one of the recipient vehicles serves as a gateway vehicle for a neighboring geofence that overlaps with a geofence comprising the recipient vehicle (that also serves as the gateway vehicle for recipient vehicles in the neighboring geofence), according to some embodiments.

FIG. 5 illustrates a top view of a roadway wherein vehicles in the roadway are included in overlapping geofences, and wherein gateway vehicles receive an artifact to be distributed from a roadside resource and distribute the artifact to recipient vehicles in their respective geofences, wherein at least one of the recipient vehicles serves as a gateway vehicle for a neighboring geofence that overlaps with a geofence comprising the recipient vehicle (that also serves as the gateway vehicle for recipient vehicles in the neighboring geofence), according to some embodiments.

As an example, roadside resource 502 may be positioned adjacent to a roadway and may overlap multiple geofences formed by gateway vehicles, such as geofence A corresponding to an antenna range of gateway vehicle 504 and geofence C corresponding to an antennae range of gateway vehicle 508. An artifact may be distributed from roadside resource 502 to the respective gateway vehicles 504 and 508. In turn gateway vehicle 504 may distribute the artifact to other recipient vehicles in geofence A and gateway vehicle 508 may distribute the artifact to other recipient vehicles in geofence C.

Additionally, one of the recipient vehicles may also function as a gateway vehicle for an adjoining geofence having a range based on an antenna of the recipient vehicle. For example, gateway vehicle 506 may have a geofence corresponding to geofence B and may serve as a gateway resource for geofence B, wherein gateway vehicle 506 distributes the artifact receive from gateway vehicle 504 to other recipient vehicles in geofence B. In a similar manner, gateway vehicle 512 may distribute the artifact received from gateway vehicle 508 to other recipient vehicles in geofence D and gateway vehicle 510 may distribute the artifact received from gateway vehicle 508 to other recipient vehicles in geofence E.

As can be seen in FIG. 5 vehicle-to-vehicle distribution may harness overlapping geofences to extend a distribution range of physical infrastructure such as the roadside resource 502 to provide high-speed distribution at lower cost. For example, it is not necessary to install more roadside resources in order to extend the distribution range from geofences A and C (that overlap with the roadside resource) to include other geofences such as geofences B, D, and E that do not directly overlap with the roadside resource 502.

Figure 6:
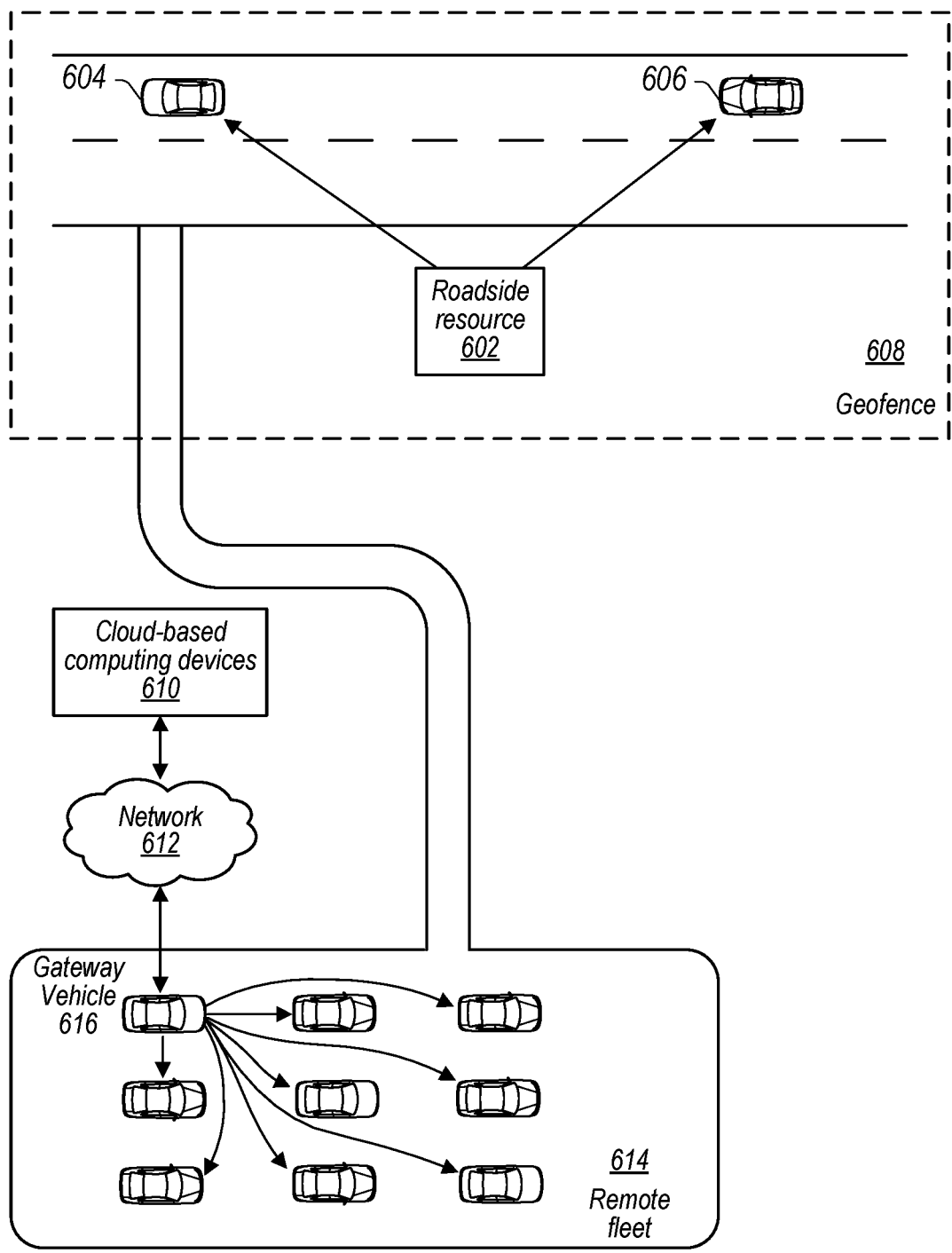
FIG. 6 illustrates a top view of a roadway and a remote location, wherein vehicles in the roadway receive software updates and/or content from a roadside resource and a fleet of vehicles in the remote location receive the software updates and/or content via a gateway vehicle of the fleet establishing a connection with a cloud-based computing service to obtain the software update and/or content and further distribute the software update and/or content to recipient vehicles of the fleet without the recipient vehicles needing to establish a connection with the cloud-based computing service, according to some embodiments.

FIG. 6 illustrates a top view of a roadway and a remote location, wherein vehicles in the roadway receive software updates and/or content from a roadside resource and a fleet of vehicles in the remote location receive the software updates and/or content via a gateway vehicle of the fleet establishing a connection with a cloud-based computing service to obtain the software update and/or content and further distribute the software update and/or content to recipient vehicles of the fleet without the recipient vehicles needing to establish a connection with the cloud-based computing service, according to some embodiments.

In some embodiments, fleets of vehicles in a remote location away from roadside resources may be distributed artifacts using vehicle-to-vehicle distribution by providing the artifact to a gateway vehicle for the fleet using cellular or Wi-Fi distribution (or other suitable means), wherein the gateway vehicle then uses direct vehicle-to-vehicle communications to distribute the received artifact to recipient vehicles of the fleet. For example, gateway vehicle 616 which is out of range of roadside resource 602 (that provides the artifact to vehicles 604 and 606 in geofence 608) may receive the artifact from cloud-based computing devices 610 via a slightly more costly network connection 612. However, the remainder of the vehicles of remote fleet 614 may avoid having to use the slightly more costly network connection 612 by receiving the artifact directly from gateway vehicle 616 via direct vehicle-to-vehicle communication.

Figure 7:
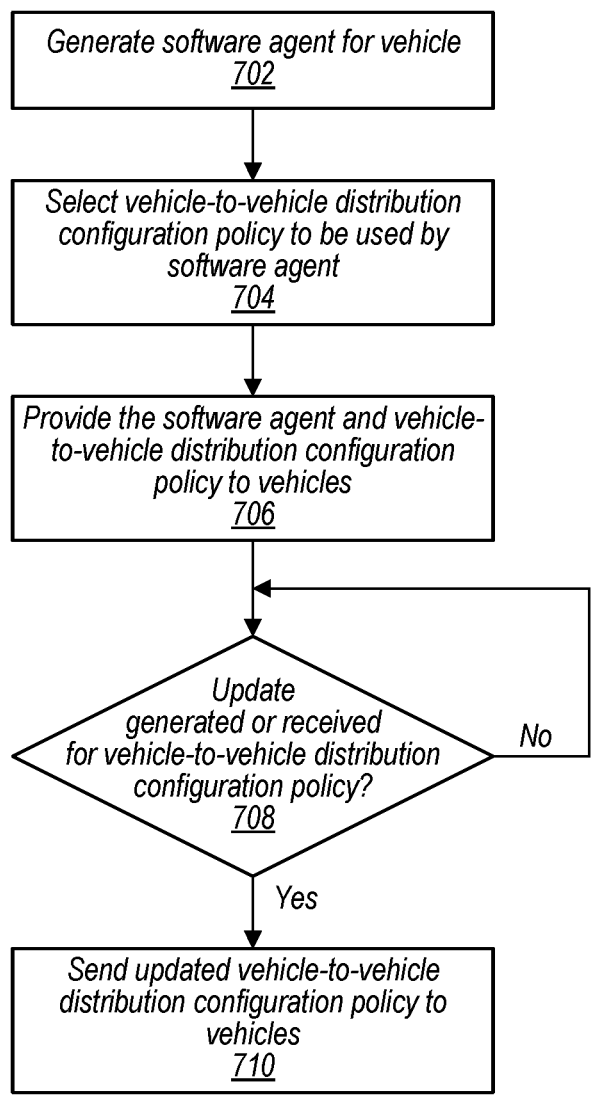
FIG. 7 is a high-level flowchart illustrating various methods and techniques to generate and distribute a software agent and an associated vehicle-to-vehicle distribution configuration policy to a plurality of vehicles, according to some embodiments.

FIG. 7 is a high-level flowchart illustrating various methods and techniques to generate and distribute a software agent and an associated vehicle-to-vehicle distribution configuration policy to a plurality of vehicles, according to some embodiments.

At block 702, a vehicle software agent distribution module, such as vehicle software agent distribution module 132 shown in FIG. 1 generates a software agent for a vehicle (or may use a stored software agent that was previously provided). At block 704, the vehicle software agent distribution module 132 selects a vehicle-to-vehicle distribution configuration policy to be used by the agent (e.g., is the agent for a gateway vehicle or a recipient vehicle, is there a fleet definition, or is the gateway vehicle and geofence dynamically determined using a leader election, etc.) At block 706, the vehicle software agent distribution module 132 provides the software agent and vehicle-to-vehicle distribution configuration policy to vehicles of a class of vehicles that are to be provided the software agent.

At block 708, the vehicle software agent distribution module determines whether or not updates have been generated or received for the vehicle-to-vehicle distribution configuration policy. If so, at block 710, the vehicle software agent distribution module sends updated vehicle-to-vehicle distribution configuration policies to the vehicles.

Figure 8:
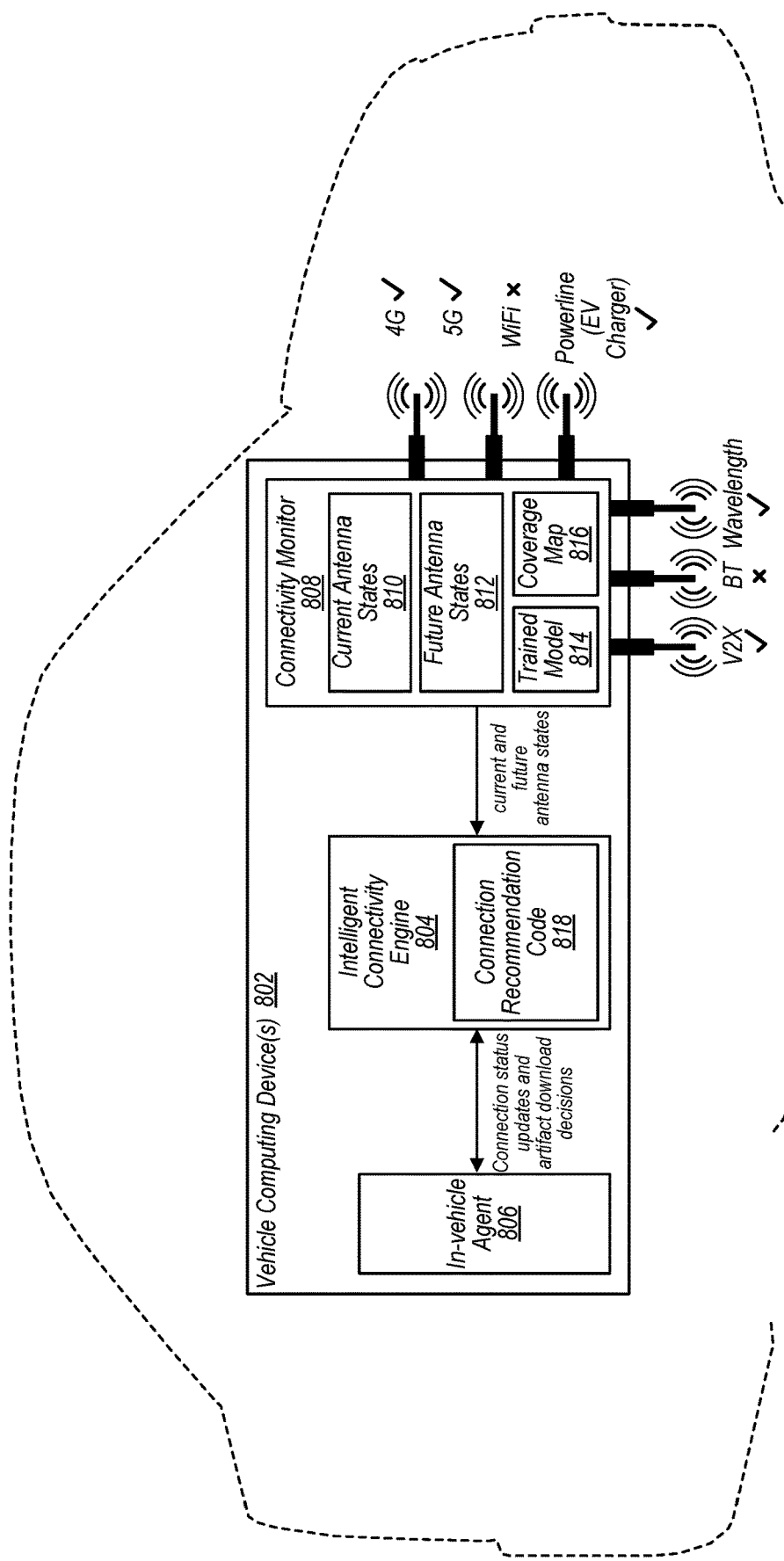
FIG. 8 is a logical diagram of a vehicle illustrating various types of antennas that may be included in the vehicle and also illustrating an intelligent connectivity engine that may determine which antenna to use for a given communication, according to some embodiments.

FIG. 8 is a logical diagram of a vehicle illustrating various types of antennas that may be included in the vehicle and also illustrating an intelligent connectivity engine that may determine which antenna to use for a given communication, according to some embodiments.

In the depicted example, one or more computing devices 802 implement an intelligent connectivity engine 804, an in-vehicle agent 806, and a connectivity monitor 808. In various embodiments, the intelligent connectivity engine, in-vehicle agent, and connectivity monitor may be implemented/distributed across any number of computing devices of the vehicle.

In some embodiments, the intelligent connectivity engine, in-vehicle agent, and connectivity monitor may be implemented within a particular computing device (e.g., within a hardware module). In an embodiment, the hardware module may be initially configured at a manufacturer site or service provider site and shipped to a client for installation at the client's site (e.g., at a vehicle assembly line). In some embodiments, some or all of the intelligent connectivity engine, in-vehicle agent, and/or connectivity monitor may be downloaded from a service provider's remote provider network (e.g., at the client's site or after the vehicle is purchased/used by a customer).

The connectivity monitor 808 may monitor/store the current antenna states 810 and/or the future antenna states 812 for any number of different antennas (or wired interfaces) of the vehicle that may each transmit/receive radio signals according to a different radio protocol (or according to different wired protocols in the case of wired interfaces). In the depicted example, the antennas include a vehicle-to-vehicle antenna (V2X), a Bluetooth antenna (BT), a wavelength antenna, a 4G antenna, a 5G antenna, a Wi-Fi antenna, and a powerline wired interface (e.g., for use with an electric vehicle charger).

The connectivity monitor 808 may also include one or more trained models 814. A trained model may be trained to use inputs based on a current state of a connectivity options, a current location of the vehicle, a local coverage map, an expected future location of the vehicle (which may itself be determined from a trained model), and/or any other number of inputs and output a predicted future state of the connectivity option (e.g., at one or more points in time in the future and/or during one or more future time windows) based on the current state and/or other inputs. For example, the model may output a prediction that the 5G antenna will be available with maximum bandwidth capability (or available with at least a certain level of bandwidth capability) starting in 10 minutes because the predicted location of the car in 10 minutes will be at the beginning of a 5G coverage area with a strong 5G signal. In embodiments, one or more trained models may predict where a vehicle will be at any point(s) in time in the future based on any number of inputs.

In embodiments, a future location may be predicted by a model based on any number of inputs such as a current GPS (global positioning system) location, a current/planned route that the vehicle is following, and or any other inputs, such as a predicted travel speed along one or more locations or portions of the route based on current traffic congestion/ conditions and/or predicted traffic congestion/conditions along the one or more locations or portions of the route. Another example of an input that may be used to predict a future location of the vehicle is location history. For example, the vehicle may have been driven to work along a specific route on a particular day of the week (e.g., Friday) or the vehicle may have been driven along a longer and/or different route when traffic was heavy along a more frequently used route. If it is Friday, then the model may use the specific route when predicting the future vehicle location. If there is traffic along the more frequently used route, then the model may use the longer and/or different route when predicting the future vehicle location. The connectivity monitor 808 may also include a coverage map 816, which may indicate a coverage area for one or more radio protocols used by the vehicle (e.g., for some or all of the antennas).

In embodiments, the connectivity monitor 808 may determine a current state and/or predicted future state of respective connectivity options of a plurality of connectivity options of the vehicle (e.g., multiple different antennas). As depicted, different connectivity options may be configured to communicate according to different radio protocols. The connectivity monitor 808 may then send to the intelligent connectivity engine 804 the current state and/or future state of the respective connectivity options.

Note that in embodiments, any of the techniques discussed herein for antennas (e.g., wireless communication interfaces) may also apply to any number of wired communications interfaces, such as the powerline interface of the depicted example. For example, some workloads may have criteria that specify the workload is required to use the powerline (or other type of wired communications interface) in order to transmit and/or receive data and those workloads may be assigned for current or future execution, based at least on the current and/or predicted state of the powerline.

The in-vehicle agent 806 may store a vehicle-to-vehicle distribution configuration policy and may receive advertisements from intelligent connectivity engine 804. The in-vehicle agent and/or intelligent connectivity engine 804 may determine whether or not to receive an artifact and, if to receive the artifact, what type of connection to use based on connection recommendation code 818 and based on a vehicle-to-vehicle distribution policy indicated for an advertised artifact. For example, different decisions may be made for artifacts with a speed optimized vehicle-to-vehicle distribution policy as compared to artifacts with a cost optimized vehicle-to-vehicle distribution policy.

In embodiments, the execution criteria may include any number of criteria for data transmission and/or any other criteria that must be satisfied in order to receive the artifact.

The intelligent connectivity engine 804 may receive the current state and/or future state of the respective connectivity options as well as prioritization information for the artifact (determined based on the vehicle-to-vehicle distribution policy for the artifact). Based at least on the current state and/or future state of the respective connectivity options and based on the prioritization of the artifact, the intelligent connectivity engine may assign at least one artifact for current retrieval and at least another artifact for future retrieval.

In an embodiment, to determine the future state of a particular antenna, the connectivity monitor (or intelligent connectivity engine) may determine the future state for the particular antenna based at least on one or more of a planned route for the vehicle, a coverage map 816 for a radio protocol used by the antenna, and/or one or more environmental conditions for at least a portion of the planned route.

For example, the intelligent connectivity engine may determine that, at the current vehicle speed and based on the planned route and coverage map, the future state of the particular antenna will be much higher bandwidth capability starting in 10 minutes (e.g., an upcoming strong signal area on the coverage map).

As another example, the intelligent connectivity engine may determine that, at the current vehicle speed and based on the planned route and environmental conditions at an upcoming portion of the route, the future state will be much lower bandwidth capability for the particular antenna starting in 10 minutes (e.g., storm clouds that reduce bandwidth of a satellite antenna). In various embodiments, an intelligent connectivity engine and/or connectivity monitor may predict a future state of a connectivity option at any particular time in the future with or without the use of a trained model.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors.

The program instructions may implement the functionality described herein (e.g., the functionality of the vehicle software and/or content distribution system, the in-vehicle agent, the intelligent connectivity engine, the connectivity monitor, the roadside resource and any other components described herein). The various methods as illustrated in the figures and described herein represent example embodiments of methods. The order of any method may be changed, and various elements may be added, reordered, combined, omitted, modified, etc.

Figure 9:
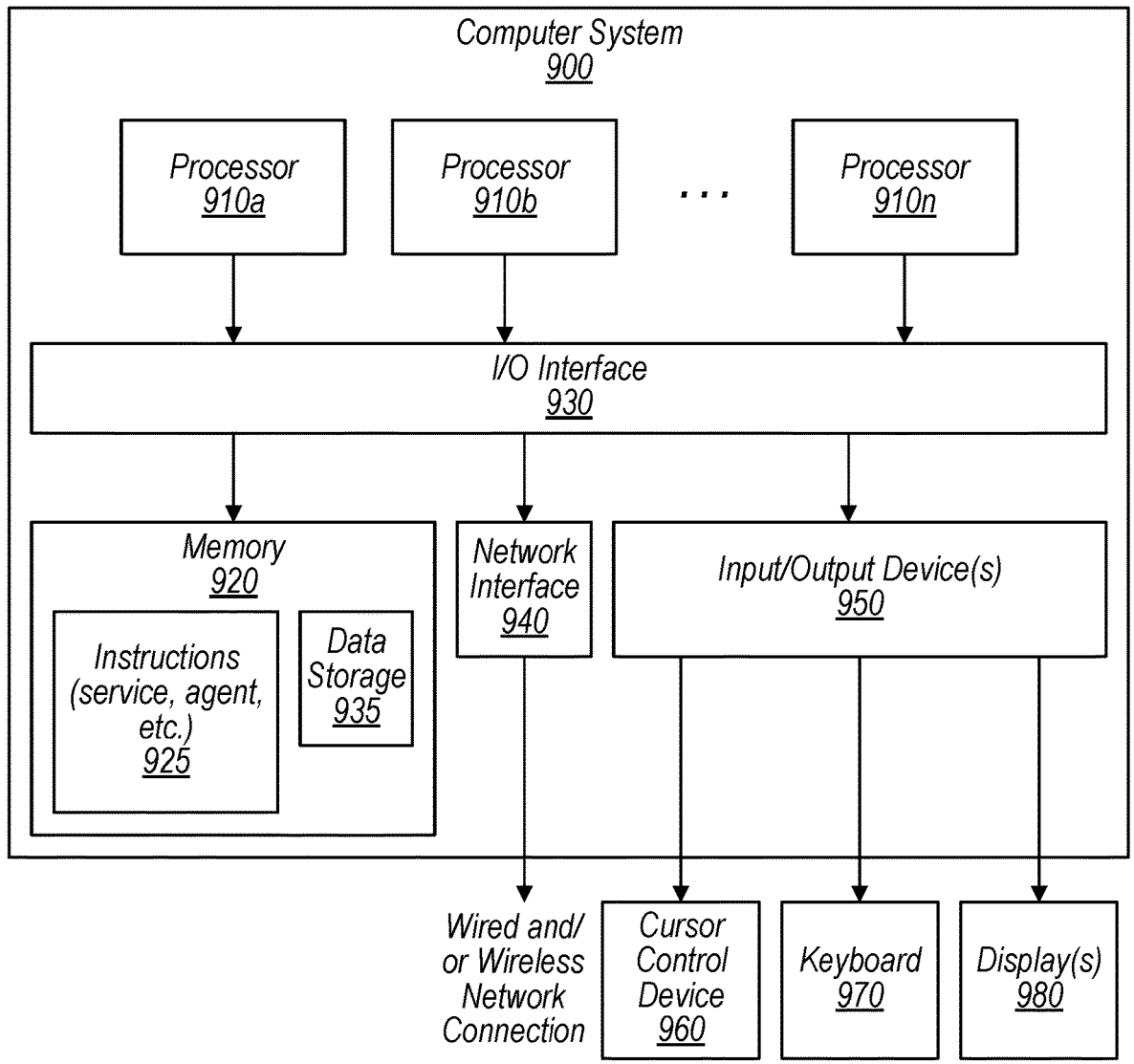
FIG. 9 is a block diagram illustrating an example computing system, according to some embodiments.

Embodiments implement vehicle software and/or content distribution using direct vehicle-to-vehicle communications, which may be implemented using one or more of various systems or devices. One such computer system is illustrated by FIG. 9. In different embodiments, computer system 900 may be any of various types of devices, including, but not limited to an application server, storage device, a peripheral device such as a switch, modem, router, or in general any type of computing node or compute node, computing device, compute device, or electronic device.

In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. Display(s) may include standard computer monitor(s) and/or other display systems, technologies or devices, in one embodiment. In some embodiments, it is contemplated that embodiments may be implemented using a single instance of computer system 900, while in other embodiments multiple such systems, or multiple nodes making up computer system 900, may host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions, in one embodiment. For example, in various embodiments, processors 910 may be general-purpose or embedded processors implementing any of a variety of instruction set architectures (ISAs), such as the x86, PowerPC, SPARC, or MIPS ISAs, ARM, or any other suitable ISA. In multiprocessor systems, each of processors 910 may commonly, but not necessarily, implement the same ISA.

In some embodiments, at least one processor 910 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 920 may store program instructions 925 and/or data accessible by processor 910, in one embodiment. In various embodiments, system memory 920 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing desired functions, such as those described above (e.g., the vehicle software and/or content distribution system, the in-vehicle agent, and any other components, etc.) are shown stored within system memory 920 as program instructions 925 and data storage 935, respectively. In other embodiments, program instructions and/or data may be received, sent or stored upon different types of computer-accessible media or on similar media separate from system memory 920 or computer system 900. A computer-accessible medium may include non-transitory storage media or memory media such as magnetic or optical media, e.g., disk or CD/DVD-ROM coupled to computer system 900 via I/O interface 930. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 840, in one embodiment.

In one embodiment, I/O interface 930 may be coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. In addition, in some embodiments some or all of the functionality of I/O interface 930, such as an interface to system memory 920, may be incorporated directly into processor 910.

Network interface 940 may allow data to be exchanged between computer system 900 and other devices attached to a network, such as other computer systems, or between nodes of computer system 900, in one embodiment. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or retrieving data by one or more computer system 900, in one embodiment. Multiple input/output devices 950 may be present in computer system 900 or may be distributed on various nodes of computer system 900, in one embodiment. In some embodiments, similar input/output devices may be separate from computer system 900 and may interact with one or more nodes of computer system 900 through a wired or wireless connection, such as over network interface 940.

As shown in FIG. 9, memory 920 may include program instructions 925 that implement the various embodiments of the systems as described herein, and data store 935, comprising various data accessible by program instructions 925, in one embodiment. In one embodiment, program instructions 925 may include software elements of embodiments as described herein and as illustrated in the figures. Data storage 935 may include data that may be used in embodiments (e.g., vehicle-to-vehicle distribution policies, vehicle-to-vehicle distribution configuration policies, state of antenna or other connectivity option, coverage map, model, policy code, configuration data, data, metadata, etc.). In other embodiments, other or different software elements and data may be included.

Those skilled in the art will appreciate that computer system 900 is merely illustrative and is not intended to limit the scope of the embodiments as described herein. In particular, the computer system and devices may include any combination of hardware or software that can perform the indicated functions, including a computer, application server, storage device, a peripheral device such as a switch, modem, router, or in general any type of computing or electronic device. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 900 may be transmitted to computer system 900 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system comprising:
one or more roadside network resources; and
one or more cloud-based computing devices configured to implement a vehicle software and/or a content distribution system, wherein the vehicle software and/or the content distribution system is configured to:
receive, via an application programmatic interface (API) implemented on at least one of the one or more cloud-based computing devices, an artifact to be distributed to a class of vehicles, wherein the artifact comprises a software update to be provided to one or more vehicles of the class of vehicles or content to be provided to the one or more vehicles of the class of vehicles;
select a vehicle-to-vehicle distribution policy from a plurality of vehicle-to-vehicle distribution policies that have different cost and speed configurations to be used to distribute the artifact to the class of vehicles, wherein the vehicle-to-vehicle distribution policy is selected based on cost and speed factors associated with the artifact; and
provide, the artifact and associated metadata indicating the vehicle-to-vehicle distribution policy to be used to distribute the artifact, to a given one of the one or more roadside network resources,
wherein the given one of the one or more roadside network resources is configured to:
provide the artifact and the associated metadata to a first vehicle of the class of vehicles, and
wherein, in accordance with the vehicle-to-vehicle distribution policy, the first vehicle of the class of vehicles provides the artifact and the associated metadata directly to other vehicles of the class of vehicles.

2. The system of claim 1, wherein the vehicle software and/or the content distribution system is further configured to:
receive, with the artifact, via the API, one or more distribution criteria for distributing the artifact to the one or more vehicles of the class of vehicles,
wherein the vehicle software and/or the content distribution system is further configured to:
select the vehicle-to-vehicle distribution policy based on the one or more distribution criteria received with the artifact, wherein the selected vehicle-to-vehicle distribution policy is selected from the plurality of vehicle-to-vehicle distribution policies that have different cost and speed configurations, comprising one or more of:
a network cost optimized vehicle-to-vehicle distribution policy, wherein direct vehicle-to-vehicle distribution is to be used when costs associated with the direct vehicle-to-vehicle distribution are less than distribution without using the direct vehicle-to-vehicle distribution;
a speed optimized vehicle-to-vehicle distribution policy, wherein the direct vehicle-to-vehicle distribution is to be used when distribution time is reduced by using the direct vehicle-to-vehicle distribution as compared to distribution without using the direct vehicle-to-vehicle distribution; or
a hybrid vehicle-to-vehicle distribution policy that provides a first weighting to cost and a second weighting to speed to determine when the direct vehicle-to-vehicle distribution is to be used.

3. The system of claim 1, wherein the vehicle software and/or the content distribution system is further configured to:
implement a vehicle owner or vehicle manager application programmatic interface (API) configured to:
receive information defining a fleet of vehicles within the class of vehicles; and
an indication of one or more vehicles of the fleet of vehicles selected to serve as one or more respective gateway vehicles for the fleet of vehicles,
wherein for the one or more vehicles of the fleet of vehicles selected as the one or more respective gateway vehicles for the fleet of vehicles, the vehicle-to-vehicle distribution policy comprises instructions, that when implemented, cause the one or more respective gateway vehicles for the fleet of vehicles to:
receive the artifact from the given one of the one or more roadside network resources or from the one or more cloud-based computing devices; and
provide the artifact to respective other vehicles of the fleet of vehicles using respective direct vehicle-to-vehicle communications between the one or more respective gateway vehicles for the fleet of vehicles and the respective other vehicles of the fleet of vehicles.

4. The system of claim 1, wherein the one or more cloud-based computing devices configured to implement the vehicle software and/or the content distribution system are further configured to:
generate a software agent to be provided to the one or more vehicles of the class of vehicles, wherein the software agent is configured to interface with computing resources and network resources of a respective vehicle on which the software agent is implemented in order to cause the respective vehicle to distribute a received artifact in accordance with the vehicle-to-vehicle distribution policy.

5. The system of claim 4, wherein the vehicle software and/or the content distribution system is further configured to:
generate a vehicle-to-vehicle distribution configuration policy to be provided to the one or more vehicles of the class of vehicles, wherein the vehicle-to-vehicle distribution configuration policy, comprises:
instructions to be executed via the software agent for:
identifying other vehicles of the class of vehicles within a first geographic distance of the respective vehicle; and
selecting respective vehicles of the identified other vehicles of the class of vehicles to which a given artifact is to be provided via a direct vehicle-to-vehicle communication.

6. The system of claim 5, wherein the vehicle software and/or the content distribution system is further configured to:
provide, the one or more vehicles of the class of vehicles participating in direct vehicle-to-vehicle communications, one or more cryptographic signatures for:
validating an identity of another vehicle of the class of vehicles participating in a given direct vehicle-to-vehicle communication; and/or
authenticating a given artifact to be distributed via the given direct vehicle-to-vehicle communication.

7. A method comprising:
receiving, via an application programmatic interface (API) implemented on at least one or more cloud-based computing devices that implements a vehicle software and/or a content distribution system, an artifact to be distributed to a class of vehicles, wherein the artifact comprises a software update to be provided to one or more vehicles of the class of vehicles or content to be provided to the one or more vehicles of the class of vehicles;
selecting a vehicle-to-vehicle distribution policy from a plurality of vehicle-to-vehicle distribution policies that have different cost and speed configurations to be used to distribute the artifact to the class of vehicles, wherein the vehicle-to-vehicle distribution policy is selected based on cost and speed factors associated with the artifact; and
providing, the artifact and metadata indicating the vehicle-to-vehicle distribution policy to be used to distribute the artifact, to a roadside resource, wherein the roadside resource is configured to provide the artifact and the metadata to the one or more vehicles of the class of vehicles.

8. The method of claim 7, wherein the roadside resource comprises:
one or more computing devices configured to perform wireless communication with the one or more vehicles of the class of vehicles within a communication range of the roadside resource.

9. The method of claim 8, wherein the wireless communication is according to:
a cellular wireless standard; or
a dedicated short range communication protocol.

10. The method of claim 7, wherein the vehicle-to-vehicle distribution policy includes instructions for distributing the artifact to a group of vehicles comprising a gateway vehicle and one or more recipient vehicles, and wherein the gateway vehicle receives the artifact from the roadside resource and communicates the artifact, via vehicle-to-vehicle communication, to the one or more recipient vehicles of the group of vehicles.

11. The method of claim 10, wherein the group of vehicles comprises vehicles within a geofence, and wherein the vehicle-to-vehicle distribution policy comprises instructing for electing a gateway vehicle from amongst the vehicles within the geofence.

12. The method of claim 10, further comprising:
receiving, from a customer of a vehicle software and/or content distribution service, a message indicating:
a set of vehicles to be included in a fleet of vehicles; and
one or more vehicles of the fleet of vehicles that are to serve as one or more gateway vehicles for the fleet of vehicles; and
including in the vehicle-to-vehicle distribution policy, or in the metadata, an indication of the set of vehicles to be included in the fleet of vehicles and an indication of the one or more gateway vehicles for the fleet of vehicles.

13. The method of claim 7, wherein the vehicle-to-vehicle distribution policy comprises instructions, that when executed via an agent installed on a vehicle receiving the artifact, cause the agent to:
store the content included in the artifact in a storage of the vehicle or cause the vehicle to implement the software update; and
advertise the content or the software update to other vehicles included in a fleet of vehicles or a geofence with the vehicle receiving the artifact.

14. The method of claim 7, wherein the vehicle-to-vehicle distribution policy comprises instructions, that when executed via an agent installed on a vehicle receiving the artifact, cause the agent to:
determine the content included in the artifact is not to be stored in a storage of the vehicle or the software update is not to be implemented at the vehicle;
cache the artifact in a vehicle-to-vehicle communication cache implemented at the vehicle receiving the artifact; and
advertise the content or the software update to other vehicles included in a fleet of vehicles or a geofence with the vehicle receiving the artifact.

15. The method of claim 7, further comprising:
receiving, from the roadside resource, an indication of a number of recipient vehicles to which a given gateway vehicle distributed the artifact; and
crediting an account associated with the given gateway vehicle based on the number of recipient vehicles to which the given gateway vehicle distributed the artifact.

16. The method of claim 7, further comprising:
receiving, at a gateway vehicle, the artifact from the roadside resource;
communicating the artifact, from the gateway vehicle to another gateway vehicle, wherein the gateway vehicle and the other gateway vehicle are located in overlapping geofences; and
communicating the artifact, from the other gateway vehicle to a recipient vehicle, wherein the recipient vehicle is in a geofence that does not include the roadside resource.

17. The method of claim 7, further comprising:
providing, by the roadside resource, an indication to a vehicle that the artifact is available to be distributed to the vehicle,
wherein an agent implemented at the vehicle is configured to determine whether to:
receive the artifact from the roadside resource;
receive the artifact via a network connection to the one or more cloud-based computing devices that implement the vehicle software and/or the content distribution system; or
receive the artifact from another vehicle via a direct vehicle-to-vehicle communication, and
wherein the determination is based on the vehicle-to-vehicle distribution policy to be used to distribute the artifact.

18. The method of claim 17, wherein the vehicle-to-vehicle distribution policy comprises one or more of:
a network cost optimized vehicle-to-vehicle distribution policy, wherein direct vehicle-to-vehicle distribution is to be used when costs associated with vehicle-to-vehicle distribution are less than distribution without using vehicle-to-vehicle distribution;
a speed optimized vehicle-to-vehicle distribution policy, wherein the direct vehicle-to-vehicle distribution is to be used when distribution time is reduced by using vehicle-to-vehicle distribution as compared to distribution without using vehicle-to-vehicle distinction; or
a hybrid vehicle-to-vehicle distribution policy that provides a first weighting to cost and a second weighting to speed to determine when the direct vehicle-to-vehicle distribution is to be used.

19. A non-transitory computer-readable storage medium storing program instructions that, when executed on or across one or more processors, cause the one or more processors to:
implement a local vehicle agent configured to:
receive an indication, from a roadside resource, of an artifact available to be communicated to a vehicle implementing the local vehicle agent, wherein the artifact has been provided to the roadside resource from one or more cloud-based computing devices that implements a vehicle software and/or a content distribution system, and wherein the artifact comprises software;
in response to receiving the indication of the artifact, determine, based on a vehicle-to-vehicle distribution policy, that the artifact is to be communicated to the vehicle, wherein the vehicle-to-vehicle distribution policy has been selected based on cost and speed factors associated with the artifact;
receive, from the roadside resource, the artifact;
in response to receiving the artifact, determine, based on the vehicle-to-vehicle distribution policy, whether the artifact is to be advertised to one or more other vehicles;
in response to determining the artifact is to be provided to the one or more other vehicles, cause the artifact to be provided to the one or more other vehicles via vehicle-to-vehicle communication;
receive another indication, from the roadside resource, of another artifact available to be communicated to the vehicle implementing the local vehicle agent;
in response to receiving the other indication of the other artifact, determine, based on another vehicle-to-vehicle distribution policy, that the other artifact is to be communicated to the vehicle, wherein the other vehicle-to-vehicle distribution policy has been selected based on cost and speed factors associated with the other artifact;
receive, from the roadside resource, the other artifact;
in response to receiving the other artifact, determine, based on the other vehicle-to-vehicle distribution policy, whether the other artifact is to be advertised to the one or more other vehicles; and
in response to determining the other artifact is to be provided to the one or more other vehicles, cause the other artifact to be provided to the one or more other vehicles via the vehicle-to-vehicle communication, wherein distribution to the one or more other vehicles is different for the artifact and the other artifact based on the cost and speed factors associated with the artifact associated with the vehicle-to-vehicle distribution policy and the cost and speed factors associated with the other artifact associated with the other vehicle-to-vehicle distribution policy.

20. The non-transitory computer-readable storage medium of claim 19, wherein the local vehicle agent is further configured to:
determine whether the artifact is to be applied at the vehicle or stored to cache for re-transmission to the one or more other vehicles; and
apply the artifact at the vehicle, or store the artifact to cache for re-transmission to the one or more other vehicles, based on the determination.

* * * * *